A. J. OAKS.
LUBRICATOR.
APPLICATION FILED NOV. 25, 1908.
964,450.
Patented July 12, 1910.
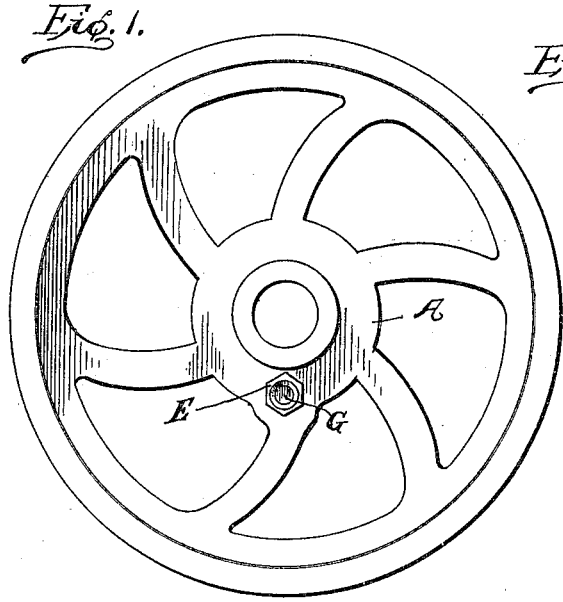
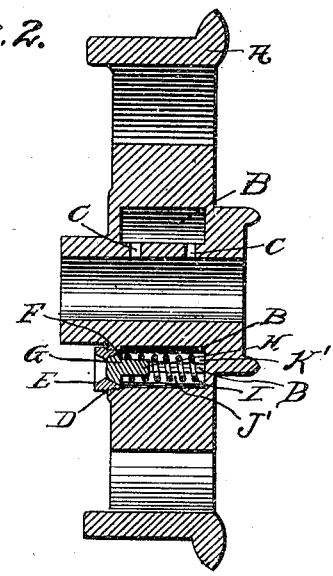
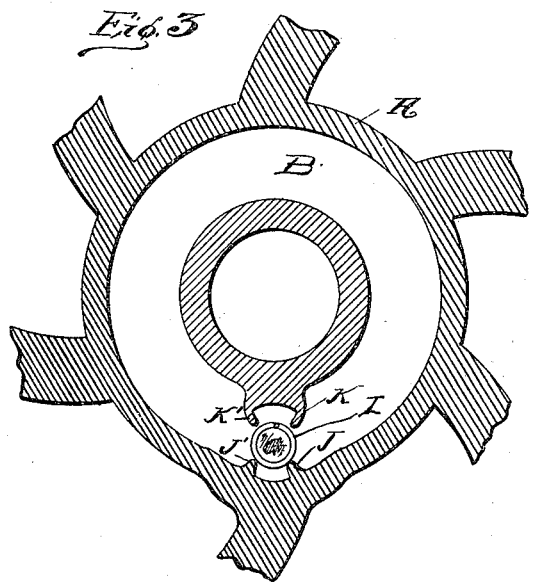
Witnesses
Inventor,
Albert J. Oaks,
By Frank S. Appleman,
Attorney

UNITED STATES PATENT OFFICE.

ALBERT J. OAKS, OF SOUTH FORK, PENNSYLVANIA.

LUBRICATOR.

964,450.

Specification of Letters Patent.  Patented July 12, 1910.

Application filed November 25, 1908. Serial No. 464,430.

*To all whom it may concern:*

Be it known that I, ALBERT J. OAKS, a citizen of the United States of America, residing at South Fork, in the county of Cambria and State of Pennsylvania, have invented certain new and useful Improvements in Lubricators, of which the following is a specification.

This invention relates to lubricators and the invention is designed primarily for use in connection with car wheels of the mine car type, although it can be employed to advantage in the construction of car wheels designed for other uses.

An object of the invention is to provide novel means for permitting the application of lubricant to a car wheel and for confining the lubricant therein in order that the said car wheel may contain a reserve for supplying oil to the bearing in small quantities as the lubricant is required.

A further object of this invention is to provide a car wheel with a valve, a spring for retaining the valve seated and novel means for confining the spring and valve stem to retain them in operative relation to the valve seat.

In car wheel lubricators now in common use, the means for retaining the valve in operative relation to the valve seat has a tendency to restrict the free circulation of the lubricant, whereas in this invention the valve stem is relatively short and the spring extends to the opposite side of the reservoir, but is guided by integral parts of the car wheel so that it cannot be displaced except by removing it from the interior of the car wheel through an opening provided primarily for its reception and for the reception of a bushing in which the valve is seated.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, in which—

Figure 1, is a view in elevation illustrating a car wheel with the invention applied thereto; Fig. 2, is a vertical central sectional view thereof; and Fig. 3, is a sectional view of the hub of the wheel on an enlarged scale.

In these drawings I have shown a wheel which resembles a wheel of ordinary type and the hub A, thereof is provided with an annular channel B, forming a reservoir and this channel is in communication with the journal bearing through the medium of the ports C, and the said ports may be multiplied according to the requirements although one or two of such ports will usually be found sufficient.

The hub is provided with a screw-threaded aperture D, designed to receive the hollow bushing E, which bushing has a valve seat F, in its inner side designed to be engaged by the valve G, and the said valve G, has a short stem H, encircled by a spring I. The spring I, bears against the valve and has its opposite end bearing against the inner wall of the reservoir or channel B.

In order to confine the spring and hold it in operative relation to the valve, the interior of the hub of the wheel is provided with the ribs J, J', K, K', the said ribs J and J', extending from the outer wall of the channel and the ribs K, K', extending from the inner wall of the channel so that they engage the spring I, and form guides therefor. From an inspection of Fig. 3, it will be seen that the spring cannot move laterally out of engagement with the ribs and in fact the only movement that is permitted said spring is a movement longitudinally of its axis, thus the said spring may be compressed or it may expand freely, but it cannot be displaced from engagement with the ribs except to be withdrawn from the channel through the screw-threaded opening D, in the side of the hub.

By reason of the construction of the wheel, the number of the parts are minimized for, as the ribs are integral with the hub of the wheel, they are formed at the time the hub is cast and this part of the wheel does not require finishing, as it is completed with the casting operation. In manufacturing the wheel with the lubricating device thereon, it only remains to tap the opening in the side of the hub and apply the bushing, valve, and spring thereto.

I claim—

In a car wheel, the combination with a hub having an annular channel therein, ribs integral with one wall of the channel, the said ribs extending transversely of the hub and projecting into the channel, a second set of ribs on the opposite wall of the channel, the said ribs extending transversely of the hub and projecting into the channel, the ribs of one wall terminating short of the ribs of the opposite wall whereby free movement of the liquid in the channel is permitted, said ribs forming a seat, a spring in the seat, a bushing in the hub having a valve seat, and a valve on the seat, the said valve being engaged by the spring.

In testimony whereof, I affix my signature in the presence of two witnesses.

A. J. OAKS.

Witnesses:
H. C. STINEMAN,
JAMES GREGORY.